United States Patent [19]

Rosenblatt et al.

[11] Patent Number: 5,606,604
[45] Date of Patent: Feb. 25, 1997

[54] SYSTEM AND METHOD FOR PREVENTING FRAUD UPON PBX THROUGH A REMOTE MAINTENANCE OR ADMINISTRATION PORT

[75] Inventors: Roberta S. Rosenblatt, East Brunswick; Joseph C. Lai, Metuchen, both of N.J.

[73] Assignee: Lucent Technologies Inc., Murray Hill, N.J.

[21] Appl. No.: 166,414

[22] Filed: Dec. 13, 1993

[51] Int. Cl.$^6$ .................................................. H04M 1/66
[52] U.S. Cl. ............................ 379/198; 379/189; 379/95; 379/35; 340/825.31; 340/825.34
[58] Field of Search .................... 379/198, 197, 379/196, 189, 128, 95, 34, 207, 225, 35, 23, 188, 145, 249; 340/825.31, 825.34, 825.32

[56] References Cited

U.S. PATENT DOCUMENTS

| | | | |
|---|---|---|---|
| 4,691,346 | 9/1987 | Vanacore | 379/198 |
| 4,712,230 | 12/1987 | Rice et al. | 379/112 |
| 4,733,345 | 3/1988 | Anderson | 379/95 |
| 4,802,217 | 1/1989 | Michener | 379/95 |
| 4,811,378 | 3/1989 | Else et al. | 379/197 |
| 4,905,281 | 2/1990 | Surjaatmadja et al. | 379/95 |
| 4,922,521 | 5/1990 | Krikke et al. | 379/95 |
| 4,935,956 | 6/1990 | Hellwarth et al. | 379/199 |
| 4,937,862 | 6/1990 | Kosich | 379/34 |
| 5,003,595 | 3/1991 | Collins et al. | 340/825.31 |
| 5,018,190 | 5/1991 | Walker et al. | 379/95 |
| 5,093,856 | 3/1992 | Atkinson | 379/95 |
| 5,131,025 | 6/1992 | Hamasaki | 379/95 |
| 5,146,490 | 9/1992 | Bechman | 379/113 |
| 5,220,599 | 6/1993 | Sassano et al. | 379/196 |
| 5,222,120 | 6/1993 | McLeod et al. | 379/201 |
| 5,319,702 | 6/1994 | Kitchin | 379/199 |
| 5,329,570 | 7/1994 | Glassmacher et al. | 379/189 |
| 5,345,595 | 9/1994 | Johnson et al. | 379/60 |
| 5,351,287 | 9/1994 | Bhattacharyya et al. | 379/95 |
| 5,351,290 | 9/1994 | Naeini et al. | 379/127 |
| 5,394,458 | 2/1995 | Allen et al. | 379/34 |
| 5,414,755 | 5/1995 | Bahler et al. | 379/67 |

FOREIGN PATENT DOCUMENTS

| | | | |
|---|---|---|---|
| 8700376 | 1/1987 | United Kingdom | 379/189 |
| 9101027 | 1/1991 | WIPO | 379/95 |

OTHER PUBLICATIONS

Jim Smith, Electronics, Mar. 8, 1984, pp. 31–36.
IBM Technical Disclosure, vol. 30, No. 3, Aug. 1987.
Control Cable, Inc., Security Devices, pp. 74–76.

*Primary Examiner*—Thomas W. Brown
*Assistant Examiner*—Parag Dharia

[57] ABSTRACT

A system and method for preventing fraudulent calling activities of computer data systems such as a Private Branch Exchanges (PBX) accessed through dial-up telephone lines via a remote maintenance or administration port. The system is readily adaptable to existing PBX systems without the need to alter PBX hardware or software configurations. The system includes a device to passively monitor calling activity conducted through the remote port of the PBX without alerting the caller in order to detect a condition of activity indicative of fraud. The monitoring device may include rule based expert system software to analyze call transmission data for activities outside the norm that are indicative of fraud. Alternatively, the monitoring device may include software or hardware for comparing call digit origination data to a database of authorized call activity contained within the monitoring device. Upon the indication of a fraudulent call, the system causes the disconnection of the call from the PBX to minimize economic loss to, PBX customer and telecommunication service provider.

33 Claims, 6 Drawing Sheets

SYSTEM AND METHOD FOR PREVENTING FRAUD UPON PBX THROUGH A REMOTE MAINTENANCE OR ADMINISTRATION PORT

TECHNICAL FIELD

The invention relates to a system and method for preventing fraud upon computer data systems remotely accessed through a dial-up remote login facility, and more particularly, to a system and method for preventing fraud upon customer Private Branch Exchanges (PBX's) through the remote maintenance port or the remote administration port of the PBX.

PROBLEM

Typically, most computer data systems are provided with a dial-up remote login facility to allow remote use of the computer data system. In a computer data system such as a PBX, the dial-up remote login facility is typically used for remote maintenance or administration. As such, the dial-up remote login facility for the PBX (often referred to as a remote maintenance or administration port) is provided to allow either the customer and/or person or entity responsible for maintaining/administering the PBX system ("PBX maintainer") with a way to maintain and/or administer the PBX from a remote location. The typical maintenance and/or administration port is normally an ordinary dial-up telephone line interfaced to the PBX, for example, by an asynchronous terminal interface. Remote access will permit a user located outside the PBX system to access the system through a public or private telephone network so as to administer and/or maintain the PBX.

One problem associated with remote administration or maintenance ports is the opportunity they present for practicing a fraud upon the computer data (PBX) system. For example, by employing the remote port, a fraud perpetrator may access the computer data system (PBX) over the telephone lines so as to manipulate the commands associated with the system in a manner to reconfigure the PBX to allow fraudulent calls. Such activity is often conducted during off-business hours, when legitimate customer activity on the system is at a minimum, so that the fraud perpetrator is often able to restore the PBX to its original state prior to the full resumption of business activity by the PBX customer. Thus, the customer will often be unaware that the system has been compromised. The fraudulent calls charged to the account of the PBX customer are often contested by him, so that the PBX customer and/or the telecommunications provider must often "write off" those calls and absorb the costs and expenses associated with the fraudulent activity.

Systems have been proposed to prevent fraud on computer data systems such as PBX's. A number of these do not directly address the fraud which is perpetuated through the dial-up remote login facility (remote maintenance or administration ports). For example, systems have been proposed to control fraud through the switches of the telephone system network to deny access to unauthorized callers by incorporating screening tables in denial files maintained by the network. Customer identified destinations are defined in the denial files so that calls to other destinations may be blocked or subjected to other predetermined constraints. However, such systems do not account for or protect against a fraud perpetrator who has successfully entered the computer data system (PBX), nor do they monitor the activity of unauthorized users once they have compromised the security systems. In the context of remote access fraud—that is, fraud perpetrated by acquiring a remote access code to a computer data system such as a PBX—digital signal processing techniques have also been proposed to detect such fraud. For instance, voice or data signals inbound and outbound from the network may be monitored and analyzed for identifying given patterns which would correlate to a level of fraud. However, it is feasible that a fraud perpetrator could circumvent such efforts. For example, the fraud perpetrator might devise ways, both direct and indirect, to alter signal patterns or characteristics so as to defeat the processing techniques.

Figure 1:
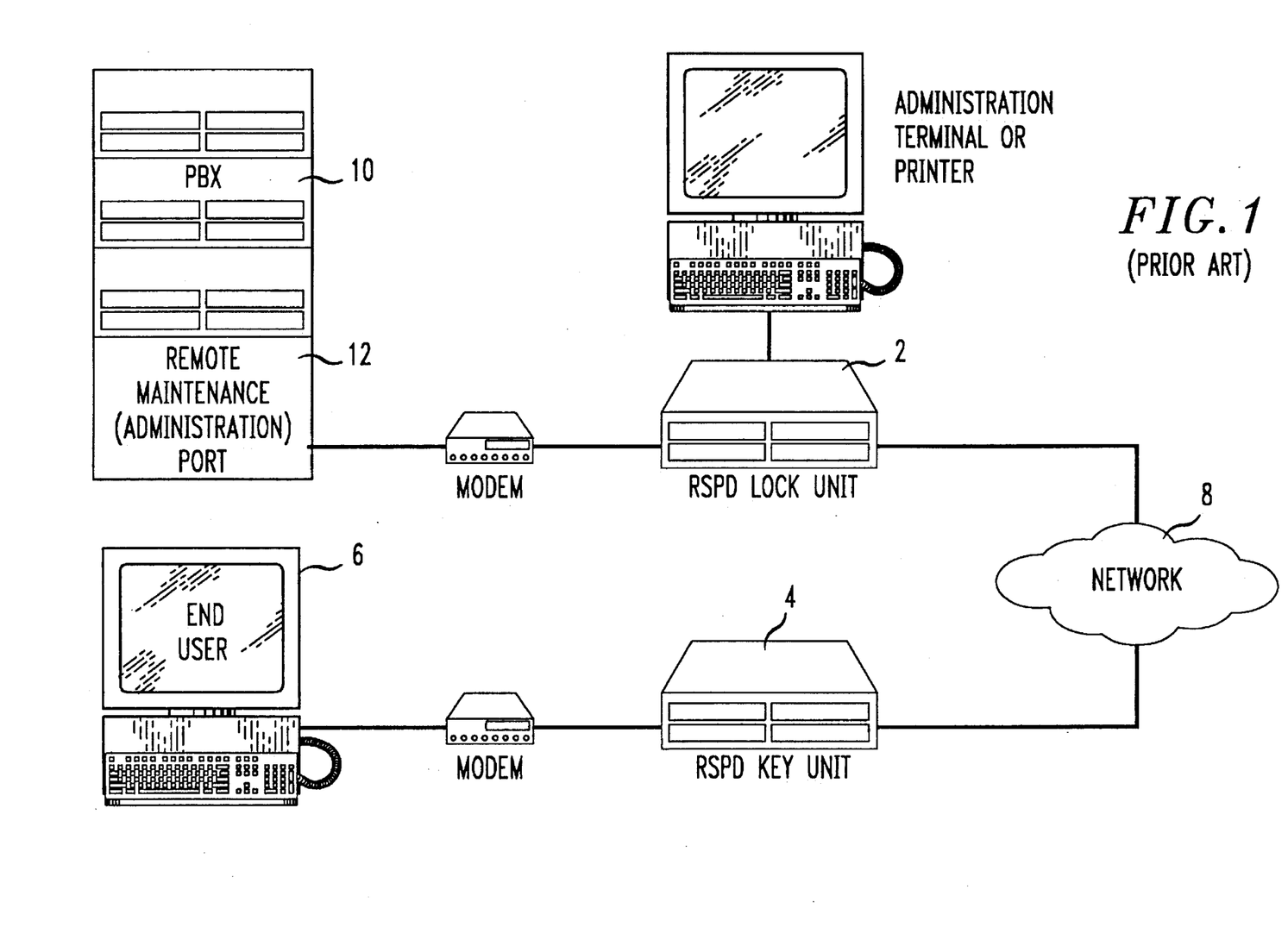
FIG. 1 depicts a prior remote port security device of the system key-lock type with a key-lock handshake protocol.

One known approach to preventing fraud conducted through remote maintenance or administration ports is the "Remote Port Security Device" (RPSD) manufactured and sold by AT&T for use, for example, with AT&T Definity® PBX systems. A schematic overview of such system depicted at FIG. 1. As shown, a lock unit 2 is provided to prevent unauthorized access to a remote maintenance or administration port 12 of a PBX 10. A key unit 4 is also provided to "unlock" lock unit 2 so as to access the PBX. In use, a user 6 attempting to gain access to the PBX 10 must enter a special code to enable key unit 4 to transmit encrypted data through the network 8 to the lock unit 2. If there is no "handshake" match of encrypted data between the key and lock units, the lock unit 2 will prevent the user 6 from entering the PBX via the remote port 12. While such system is useful to protect against unauthorized access to the PBX, an unauthorized user having access to code data or otherwise being able to discern access codes can still compromise the key unit to enter the PBX and reconfigure same so as to defraud the customer. In addition, such a "lock and key" system does not prevent the continuation of fraudulent activity once an unauthorized user has been able to enter the PBX system. Moreover, the system is somewhat costly in that a separate key unit is required for each location wherein remote access is desired for the PBX. This results in elevated costs for those users having a need to maintain or otherwise administer the PBX from varied or disparate locations.

SOLUTION

In accordance with the invention, a system and method are provided to address and prevent fraudulent activity committed against a computer data system, such as a PBX system, which fraudulent activity is typically conducted over a dial-up phone line linked to a dial-up remote login facility (remote maintenance or administration port) of the computer data system (PBX). For clarity of description, the embodiments of the invention and the drawing figures therefore are discussed with regard to an example of a computer data system—a PBX. It will be realized and understood by those skilled in the art that the system and method according to the invention and the benefits thereof as described herein and depicted by the figures are applicable to any computer data system which can be remotely accessed over a dial-up telephone line through a dial-up remote login facility.

In accordance with the invention, the system analyzes PBX transmission data in real time without interference with transmission to and from the PBX and monitors the transmitted data to discern whether the use is authorized or whether there is aberrant activity indicative of fraud upon the PBX. Upon the detection of unauthorized use or activity indicative of fraud, the system will terminate the call, thereby minimizing losses to the PBX customer and the telecommunications service provider. The system is highly effective and superior to "lock and key" fraud control systems in minimizing losses to service provider and customer due to fraudulent activity within the PBX. Because the system is not limited to access denial protection of the PBX but can detect ongoing unauthorized activity, fraudulent activity can be regularly remedied as detected to keep overall PBX losses at a minimum. Moreover, the system is readily adaptable to various PBX's without need for additional hardware at the authorized remote locations.

In one embodiment, a tap sends data transmitted to and from the telephone network to a modem modified to not participate in the V.25 automatic answering sequence so as to permit passive monitoring of calls to and from PBX without interfering with the communication activity occurring through the remote maintenance or administration port. A computer or other system utilizing rule-based detection software analyzes the transmitted data in real time to determine whether the activity in the PBX is suspicious and/or otherwise indicative of fraud. Where fraud is detected, the call may be terminated, thereby minimizing or eliminating fraudulent charges to the PBX. The system may be implemented as an extraneous unit onsite of the PBX and administered either directly by the PBX customer or by the PBX maintainer. The system may also be arranged to form a component of the PBX hardware itself. Alternatively, the system can be directly incorporated by the telecommunications service provider into the telephone network and implemented as an adjunct to the telephone switching system in the network.

A second embodiment is useful in detecting unauthorized or aberrant activity in locations where Local Area Signaling Services (LASS), such as the so known "Caller ID" services offered by various of the regional telephone operating companies, are available. As before, a tap in the phone sends PBX transmission data, inclusive of the caller ID "number" data, to a monitoring unit linked to the PBX from an on-site location; alternatively, the unit can be built directly into the PBX hardware. As in the prior embodiment, the unit passively monitors the data without interfering with transmission to and from the remote maintenance or administration port. The LASS number data is compared against a database of legitimate caller phone numbers authorized by the PBX customer. If a fraudulent call is detected, the call is disconnected. Alternatively, the telecommunications service provider may utilize an adjunct implemented in conjunction with the telephone switching system to monitor the calling data for authorized use.

DETAILED DESCRIPTION

Figure 2:
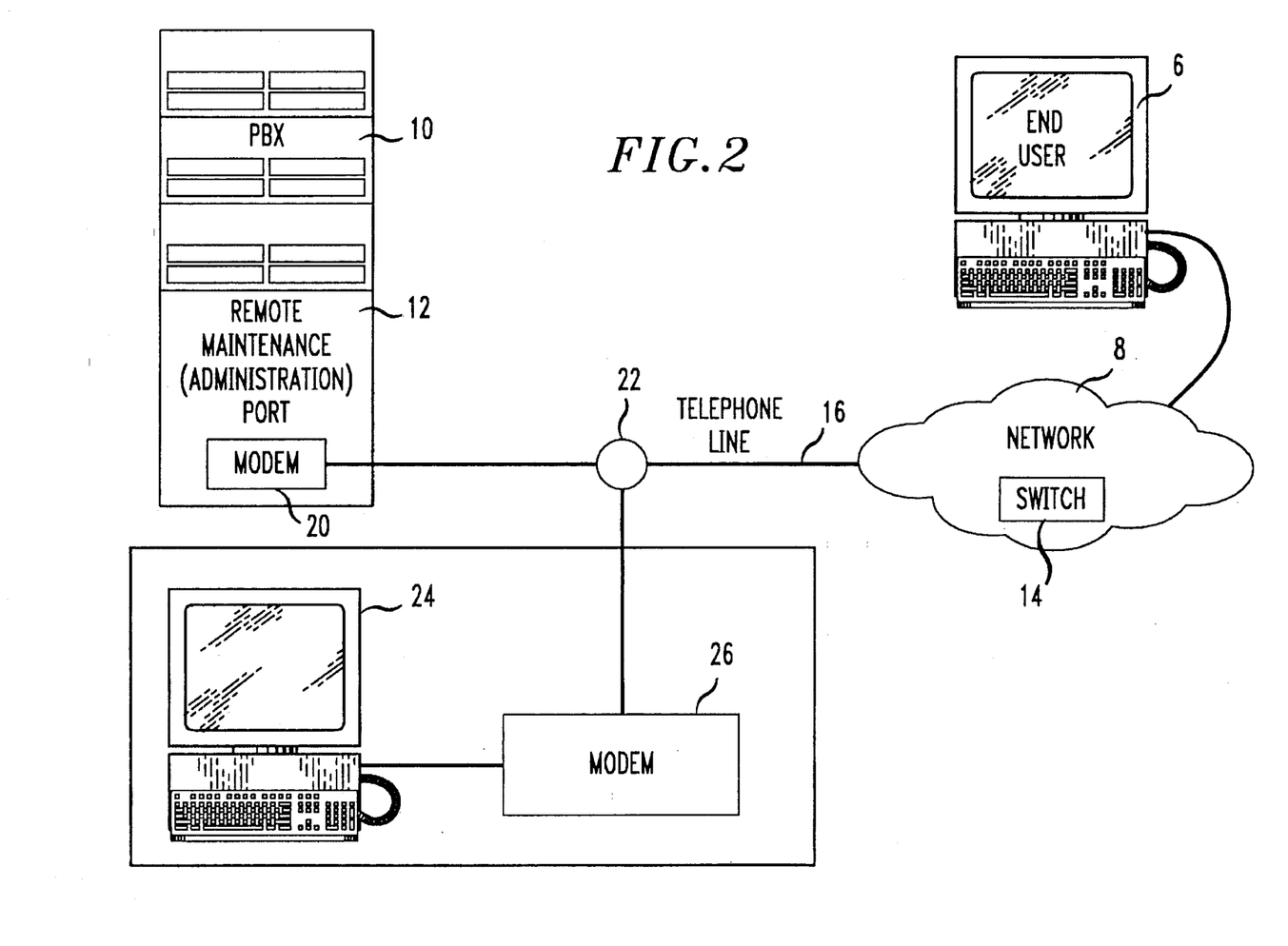
FIG. 2 depicts one embodiment of a remote port fraud control system for a PBX in accordance with the invention.
Figure 3:
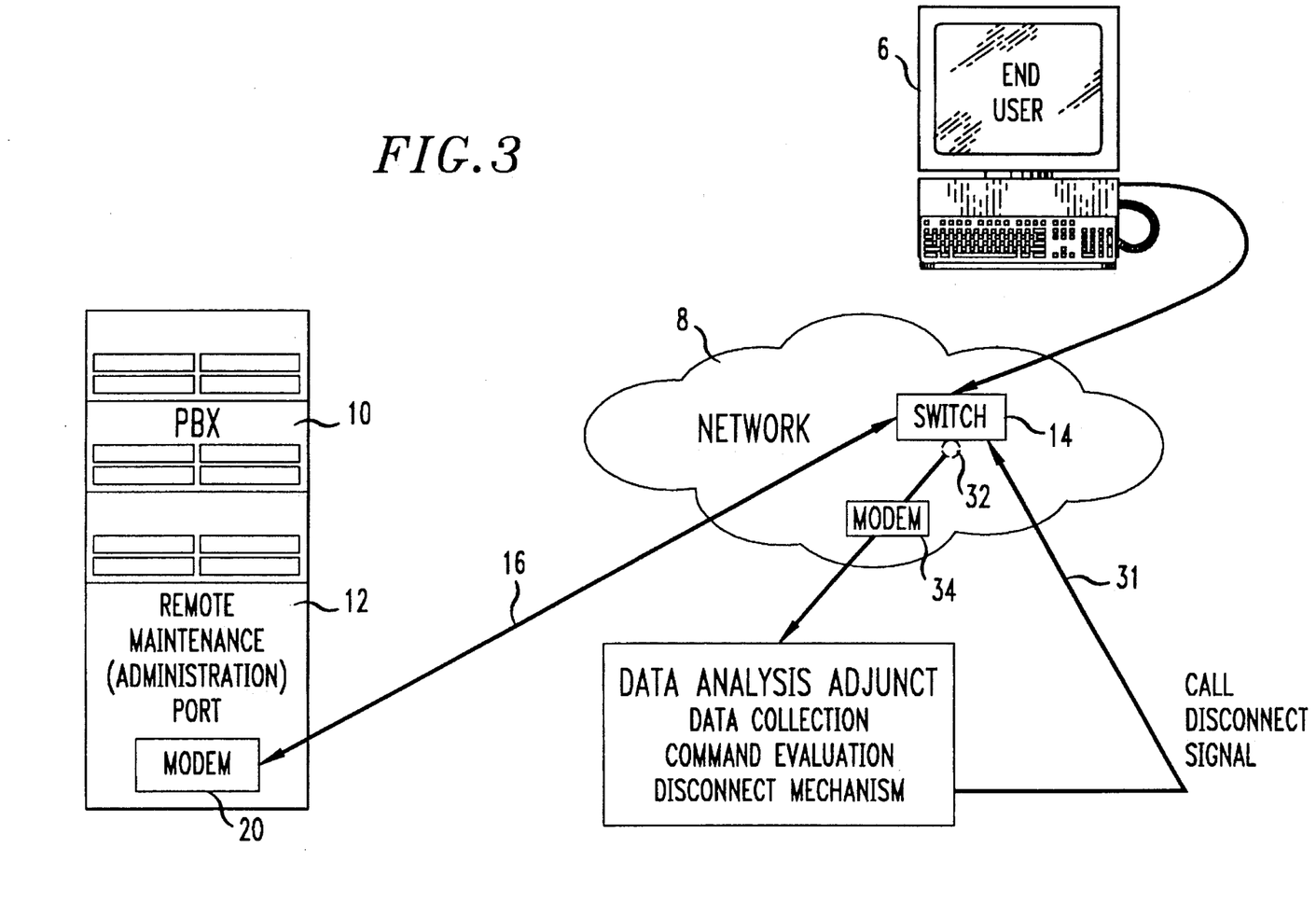
FIG. 3 illustrates a modification of the remote port fraud control system depicted in FIG. 2.

Turning now to the drawings, wherein like numerals depict like components, FIGS. 2 and 3 illustrate one embodiment of a PBX fraud control system according to the invention. This embodiment may be implemented on-site of the PBX and is adaptable to numerous vendor provided PBX's as known to those skilled in the art. The system may be conveniently implemented and/or controlled either directly by the PBX customer or by the PBX maintainer, without the need for costly modification to either PBX software or hardware. Of course, it will be understood and appreciated by those skilled in the art that the system may also be built directly into the PBX hardware as part of the overall PBX structure, the figures depicting an extraneous unit solely for purposes of illustration and not for purposes of limitation of the scope of the invention.

As shown, an end user 6 will be desirous of obtaining access to the PBX 10 via the telephone system network 8. The telephone system network will include one or more network switches 14 for routing calls in the system from the end user origination point to the appropriate destination. Examples of such switches include the ESS series manufactured and sold by AT&T. It will be readily apparent to those skilled in the art that the telephone system network 8 may be devised in various forms, including, for example, the general public telephone network; private telephone networks constructed, for example, by certain larger organizations that operate from numerous, disparate locations; or so-called "virtual networks", typically software-driven private networks maintained and administered for corporate organizations by general telephone service providers such as AT&T. Other telephone network systems known or contemplated by those skilled in the art are equally amenable to the benefits provided by the invention.

As shown, the PBX 10 may be linked to the telephone system network 8 via a dial-in telephone line 16. To facilitate remote servicing of the PBX, one or more maintenance and/or administration ports 12 may be provided and these are typically connected to the dial-in telephone line 16 via an asynchronous terminal interface, such as a modem 20, for transmitting data to and from PBX 10. As will be appreciated by those skilled in the art, modem 20 can be configured to operate, for example, in accordance with various CCITT information transmission operating standards such as V.22, V.32, etc. Those skilled in the art will also appreciate that these various CCITT standards also employ a V.25 handshake sequence for automatic answering of calls. Thus, modem 20 can be configured to operate according to one of the CCITT standards that employ V.25 and will be configured to participate in the automatic answering sequence to enable the automatic transmission of data and/or other information to and from the PBX 10. Of course, it will be understood that digital transmission hardware and techniques may also be employed to transmit data to and from the PBX 10, thereby eliminating the need for modem 20 at the port.

Figure 6:
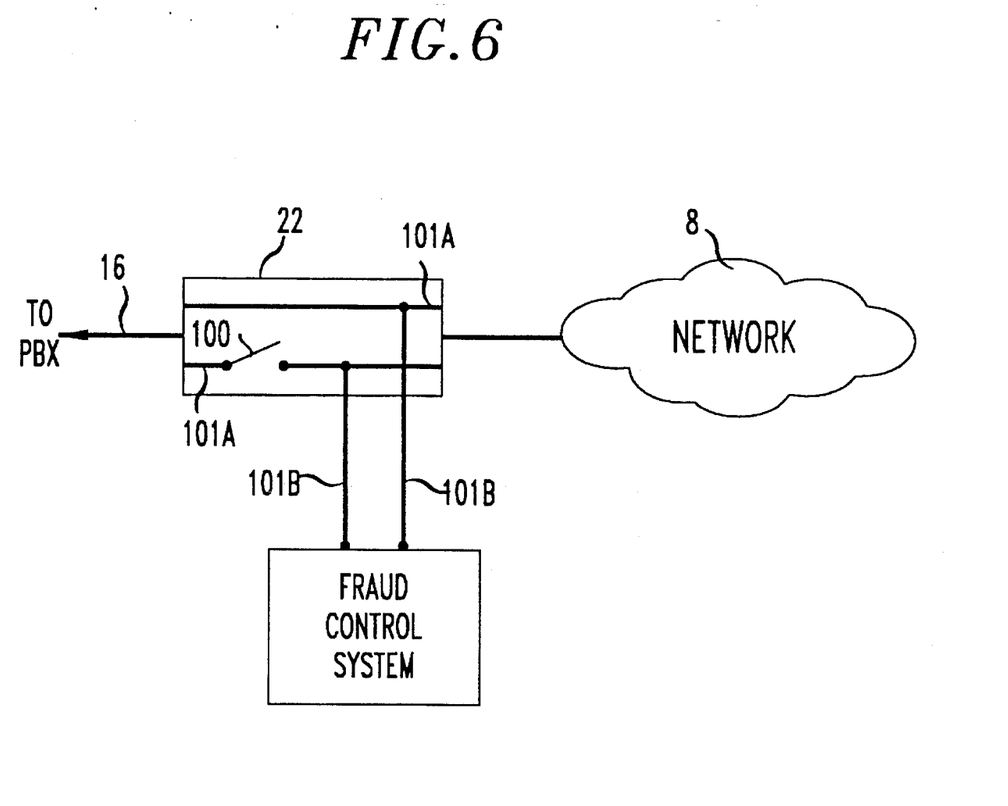
FIG. 6 illustrates a tap with a call disconnect control for routing calling data to the remote port fraud control system.

FIG. 2 depicts one embodiment of the fraud control system according to the invention. The system is readily implemented on-site of the PBX 10, or, as will be appreciated by those skilled in the art, may also be built directly into the PBX hardware. As shown, a tap 22 is provided at a given point in the telephone line 16 to also send the data that is being transmitted over the line 16 to and from the PBX 10, to means 24 for continuously analyzing the transmitted data in real time. As shown in FIG. 6, a tap 22 may be provided with a call disconnect relay 100 to disconnect a call upon the direction of means 24. The tap 22 may be configured with separate branches 101a and 101b so as to route data to and from PBX 10 (branch 101a) while also sending that data to and from data analysis means 24 (branch 101b). Upon appropriate direction of the data analysis means 24, relay 100 will be "opened" to interrupt the circuit of branch 101*a* so as to cutoff a call from an end user 6 to the PBX 10. As will be shortly explained, means 24 will analyze the transmitted data to discern aberrant behavior indicative of fraud perpetrated upon the PBX 10.

As also illustrated, a second modem 26 may be linked to the tap 22 to send the transmission data routed from tap 22 to the data analysis means without interfering with data transmission to or from PBX 10 or otherwise interfering with calling activity of the modem 20 at PBX 10. For consistency of operation with modem 20, modem 26 would be configured, for example, to operate according to the same CCITT information transmission operating standard chosen for modem 20, but should be set so as not to interfere with the calling activity conducted through the remote port 12. Of course, it will be understood and appreciated by those skilled in the art that digital transmission hardware and techniques may be employed to transmit data to and from data analysis means 24, thereby eliminating the need for modem 26. In this case, of course, such transmission would also be regulated so as not to interfere with calling activity conducted through remote port 12.

Here, modem 26 may be configured to operate, for example, according to a CCITT information transmission standard employing the V.25 handshake sequence, but without participation in the V.25 answer sequence so as not to disturb the call from being routed (answered) by modem 20 adjacent the maintenance or administration port 12. Modem 26 should monitor the handshake sequence so as to synchronize its operation with transmission of data between modem 20 and end user 6. Second modem 26 will thus allow data to go to and from the PBX without interfering with PBX activity. The data analysis means will thus synchronize with the incoming/outgoing data in real time to passively monitor the activity in the PBX without alerting the end user 6 that his activity in PBX 10 is being monitored. As will be readily apparent to those skilled in the art, the data monitoring means 24 may be administered either directly by the PBX customer or by the PBX maintainer, either on-site or from a remote location accessed through the telephone system network 8.

Numerous ways may be devised by those skilled in the art to implement data analysis means 24. For example, the data analysis means 24 may be implemented as a computer system which incorporates rule-based expert system software to analyze the captured data to detect fraudulent usage. Rule-based expert systems are well known to those skilled in the art and typically include the following characteristics: 1) a set of rules which govern certain actions to be taken; 2) working memory which stores input/output data and intermediate results (values); and 3) an inference engine which provides the reasoning capability for the system, comparing the input/output data and intermediate results to the set of rules to match conditions and triggering certain action on the part of the system.

In the context of fraud perpetrated upon PBX's, one way to configure the expert system (according to PBX type) would be to distinguish between those activities indicative of legitimate troubleshooting, and administrative activities which would serve to reconfigure the PBX for unauthorized call activity. Thus, the rule-based system may incorporate flexible controls that permit an access control software decision to be made as to whether a user is authorized to perform legitimate actions within the PBX. The rule-based software can be viewed as characterizing a particular PBX activity as most likely valid (i.e., troubleshooting activities) or most likely fraudulent (i.e., administrative activities). The activities which would constitute fraudulent behavior will be typically known to the PBX user or maintainer and can thus be anticipated by him/her and accounted for in the rule-based system. Should conditions of fraudulent use be altered or otherwise changed according to use, experience, user preference, or the like, the PBX user or maintainer can easily accommodate for same by altering the rules in the rule based system. Other rule-based systems can be implemented in manners known to those skilled in the art.

As will be appreciated by those skilled in the art, numerous variables or factors, either associated with the particular PBX or of a general nature, will dictate whether or not activity is outside of the norm so as to indicate potential fraud upon the PBX. For example, increased activity of an administrative nature outside of the norm could possibly indicate attempts to reconfigure the PBX to permit unauthorized calls. Such attempts would be even more suspect during off-business hours or off-business days. The rule-based detection software, and particularly the rules governing action by the system, can be implemented to account for a particular customer's use of the remote maintenance (or administration) port 12 and can be updated according to the customer's general experience with fraudulent behaviors. For instance, if it is the customer's practice to update his PBX only during normal business hours, administration activity outside those hours would be suspect and the customer may wish to configure data analysis means 24 to disconnect calls performing administrative tasks at non-business hours. Thus, the system is readily adaptable to changing operating conditions and can be updated as needed, rendering the system extremely versatile.

Thus, it will be appreciated that data analysis means 24 will continuously, passively monitor the data being transmitted to and from the PBX 10. Upon the indication of fraudulent activity (for example, administrative tasks conducted during non-business hours), the data analysis means 24 would relay a signal triggering disconnection of the call to prevent further fraud upon PBX 10. Disconnection of the call can occur, for example, via software driven commands relayed by the data analysis means 24 to the tap 22 in telephone line 16. The relay 100 can be opened to disconnect the circuit of branch 101*a* and, hence, prevent further calling activity to PBX 10. The modem 20 can also be configured in manners known to those skilled in the art to disconnect calls to PBX 10 upon direction of data analysis means 24. A fraudulent user will thus be "ejected" from the PBX, minimizing loss to the PBX customer and telecommunications service provider.

A variation of the above-described fraud control system is depicted at FIG. 3. Here, the fraud control system can be maintained directly by the telecommunications service provider and is controlled directly through the switching system 14 in the telephone system network 8. As before, the PBX 10 is provided with a remote maintenance or administration port 12 that is operatively connected to the phone line 16 and may receive or transmit data through an asynchronous terminal interface such as a modem 20 operating according to a CCITT transmission standard employing the V.25 handshake sequence. Here, the data analysis means may be incorporated as an adjunct device 30, located either inside of or outside of the telephone system network 8. The adjunct 30 can be operatively connected to or within the switching system 14 of network 8, for example, via a bridge 32. As will be appreciated by those skilled in the art, bridge 32 will send the data obtained from switch 14 to the modem 34, and the modem 34 will then send the data obtained from switch 14 to the adjunct 30. As before, modem 34 may be modified to not participate in the V.25 automatic answering sequence in order to send data to the adjunct 30 while not interfering with data transmission to or from the PBX 10 or otherwise interfering with the calling activity of modem 20 at the PBX 10.

For maximum flexibility, the monitor adjunct 30 may be utilized to service a plurality of PBX customers. The adjunct would include rule-based expert software as before described for detecting fraudulent activity at the PBX 10, and modified as needed to accommodate the plurality of affected PBX customers which will be serviced by the telecommunications service provider. Software and/or hardware means known or readily implemented by those skilled in the art may also be incorporated into the adjunct 30 for matching a call routed from bridge 32 with the appropriate PBX customer and, hence, with an appropriate rule-based system of a plurality thereof contained within the adjunct 30. Alternatively, the call may be matched to an appropriate portion of an overall rule-based system contained within adjunct 30 for the affected customer. Upon detecting fraudulent activity, a signal 31 may be relayed from the monitor 30 to the switch 14 so as to terminate the call.

Figure 4:
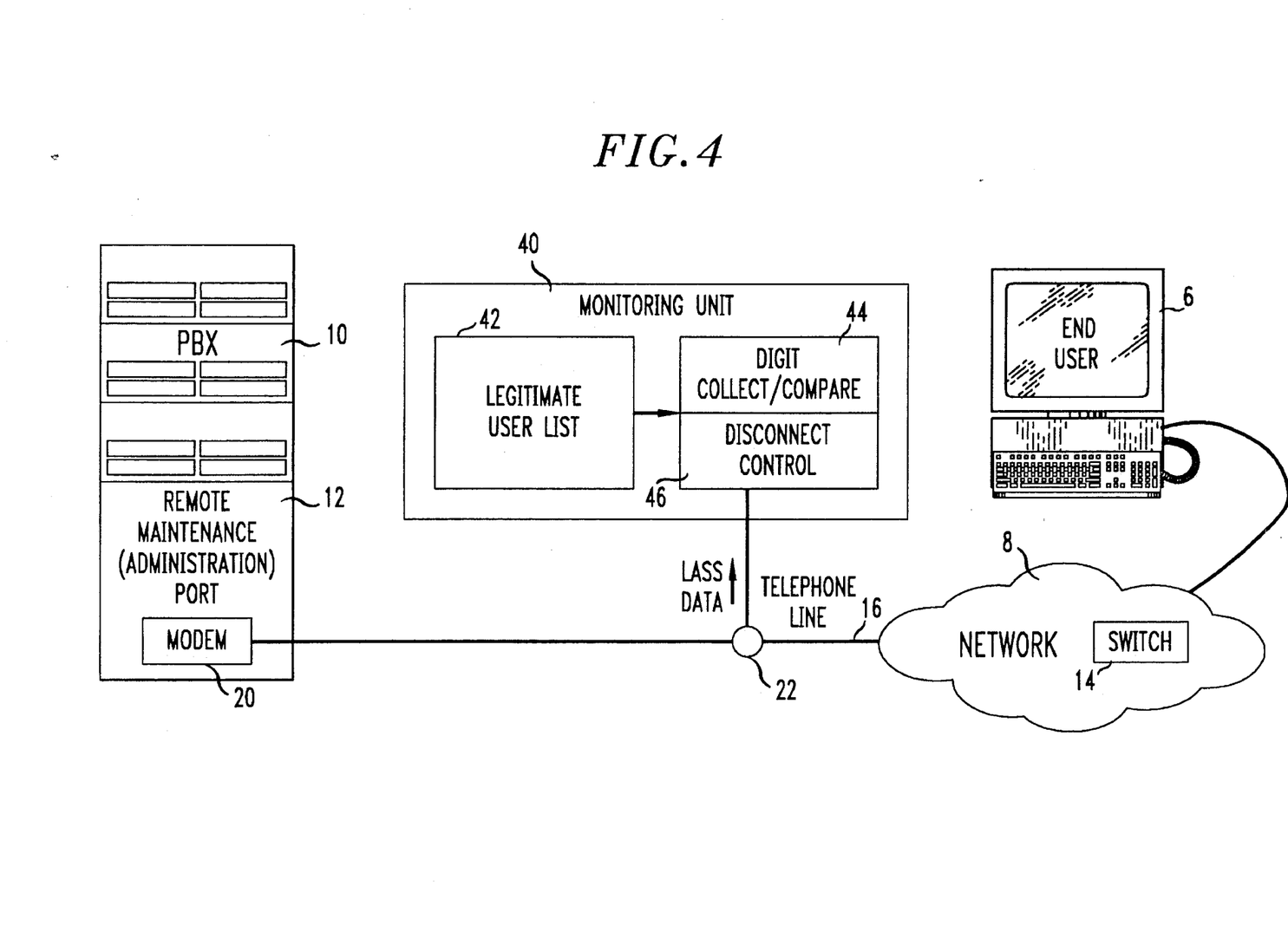
FIG. 4 illustrates a second embodiment of a remote port fraud control system for a PBX in accordance with the invention.
Figure 5:
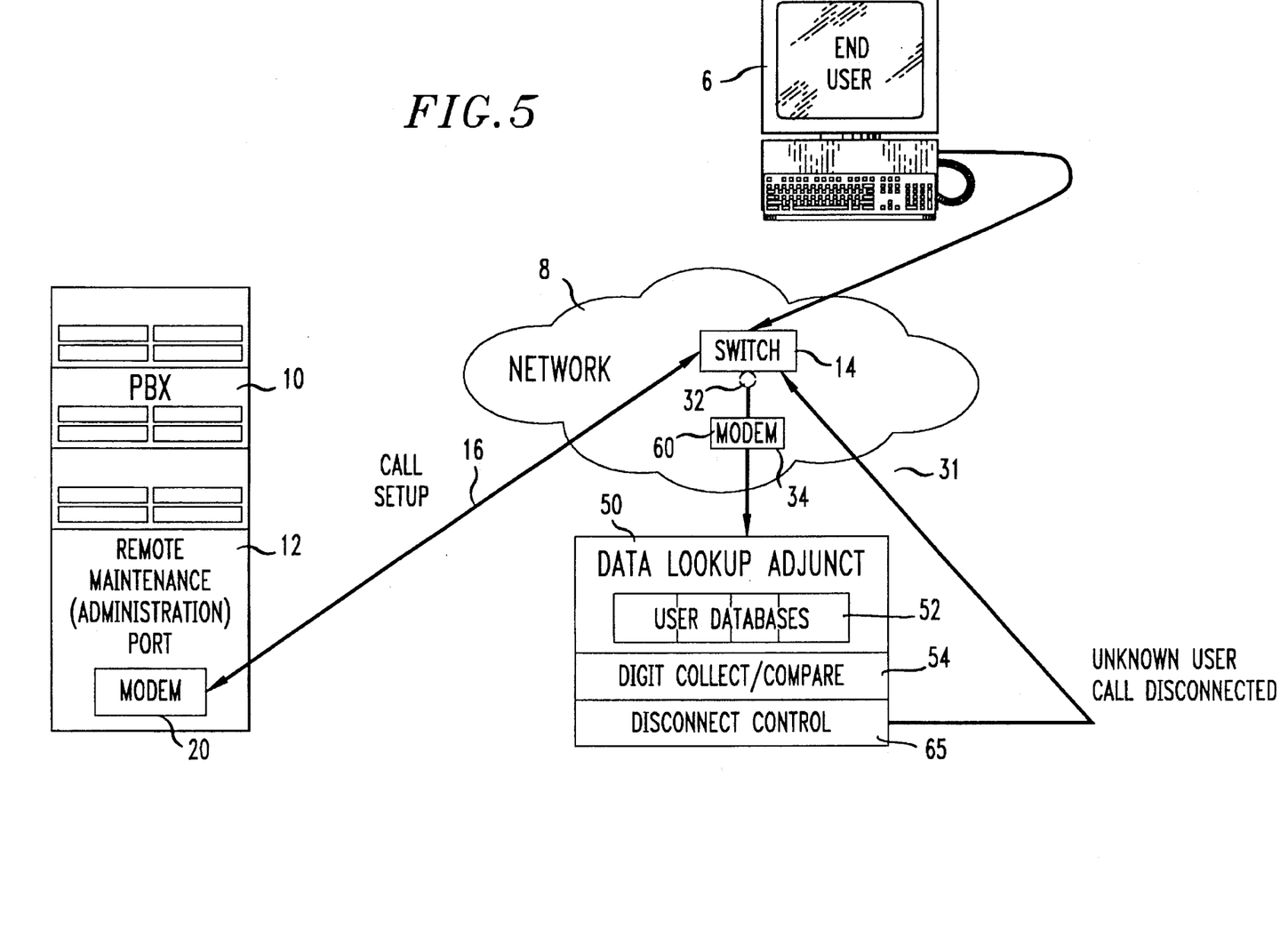
FIG. 5 depicts a variation of the remote port fraud control system depicted in FIG. 4.

FIGS. 4 and 5 illustrate a second embodiment of a fraud control system according to the invention. As in the prior embodiment, this system can passively monitor activity occurring through the PBX maintenance or administration port 12 and acts to disconnect an unauthorized call upon the detection of fraud.

FIG. 4 illustrates a variant of the embodiment useful, for example, in areas where Local Area Signaling Service (LASS) features are available. Because the unit can be readily configured to make use of the existing telephone services, this embodiment is cost-efficient and readily implemented by the PBX customer, without the need for costly revisions to existing PBX software or hardware configurations. It will also be understood and appreciated by those skilled in the art that the unit depicted in the figure can also be directly incorporated into the hardware of the PBX.

As those skilled in the art will appreciate, where LASS features are available, the digits of an originating phone number are transmitted from the call originating station to the call destination station along with the call. The phone number digits are used, for example, with Caller Identification services offered by various regional telephone service carriers.

As before, a tap 22 (FIG. 6) is provided to send data from the phone line 16 to a dedicated monitoring unit 40 in operative communication with the PBX 10. The monitoring unit may be on-site of the PBX. The monitoring unit 40 may include, for example, a database 42 of legitimate (i.e., authorized) phone numbers and may include software and/or hardware means 44 as known to those skilled in the art for comparing the incoming LASS digit information against database 42 to detect undesired or otherwise unauthorized calling activity. The monitoring unit 40 will also feature software or hardware driven call disconnect means 46 as known to those skilled in the art to cause an undesired or unauthorized call to be disconnected from the PBX 10 via the switching means 100 in the tap 22.

As will also be appreciated by those skilled in the art, owing to the transmission of LASS data with the call, the data comparison function can be conducted by monitoring unit 40 in rapid and close temporal proximity with the transmission of the call to the PBX 10. Thus, the monitoring unit 40 can be set to disconnect an unauthorized call at the earliest possible time to minimize fraud upon the PBX. If desired, the monitoring unit 40 can also be set to disconnect an unauthorized call at a desired time (for example, through the use of timer devices and/or appropriate configurations of data comparison means 44 or call disconnect means 46) according to customer need or preference. This may prove useful, for example, to allow a customer to collect data to audit fraudulent usage of the PBX. Upon detection of an incoming phone number not corresponding to an authorized number listed in the database 42, the monitoring unit 40 may either disconnect the call itself (via tap 22/disconnect means 46) thereby reducing or eliminating the level of fraudulent activity occurring in the PBX.

FIG. 5 illustrates a variant of the embodiment depicted in FIG. 4 for direct use, for example, by a telecommunications service provider. As with the embodiment illustrated in FIG. 3, an adjunct unit 50 is operatively connected to or within the switching system 14 of the telephone system network 8 to passively monitor calls through the remote maintenance (or administration) port 12 of the PBX 10. As with in the system depicted in FIG. 4, a plurality databases 52 of legitimate (authorized) phone numbers are stored in adjunct 50. In addition, software and/or hardware means 54 may be provided in the adjunct 50 to compare transmitted phone digits to a list of authorized user numbers contained within the databases 52 contained in the adjunct. Similar to the embodiment of FIG. 3, means known or readily implemented by those skilled in the art may also be provided to identify originating phone numbers in the network 8 and match same with particular PBX customers and their associated databases of authorized phone numbers. Upon detection of a fraudulent call, the adjunct 50 would disconnect the call through software disconnect controls 65 as known to those skilled in the art to transmit a signal to the switching system 14 to terminate the call.

Thus, it will be seen that the fraud prevention system in accordance with the invention provides a cost-efficient and useful way for PBX customers to passively monitor fraudulent activity conducted through remote maintenance or administration ports without the need for costly modification of existing PBX hardware or software. The system can be implemented by the PBX customer or the telecommunications service provider from any convenient remote location and eliminates the need for redundant controls at disparate or remote access sites. Further, the system provides helpful data to audit fraudulent usage so that system software can be readily updated to accommodate changing conditions of PBX use. The system is able to eliminate a significant percentage of toll fraud perpetrated through PBX remote ports, leading to increased satisfaction and economical benefit for both PBX customers and service providers.

It will, of course, be understood and appreciated by those skilled in the art that the applicability and benefits to be realized by the method and system according to the invention are not limited to fraud control of PBX's. The method and system as herein described are broadly applicable to preventing fraud to any computer data system that allows a user remote access to the computer data system via a dial-up phone line linked to a dial up remote login facility. The method and system of the invention may be used to detect the unauthorized access, or attempts to access, of any computer data system via dial-up phone lines linked to a dial-up remote login facility. Appropriate modification of the system rule-based software, legitimate phone number databases, or system hardware (passive monitoring modems, etc.) can be made to account for the particular use or practice associated with the affected computer data system of concern, without departing from the spirit and scope of the invention.

For instance, for the embodiments which track LASS phone number origination data, the fraud control system may be configured to protect any computer data system by checking that the call has originated from an authorized number.

In the context of the embodiments directed to rule-based systems, typically a user seeking access to a computer data system is asked to enter a user ID or login ID together with one or more passwords in a correct manner in order to gain entry to the computer data system. Methods that may be employed by fraud perpetrators to access the system include:

1. Trying standard user ID/password combinations, such as default ID's used for maintaining or installing the computer;
2. Implementing strategies for generating passwords to try, including:
   a. generating random or sequential passwords to try; and
   b. trying passwords from a list, such as a dictionary;
3. Implementing strategies for generating user IDs to try, including:
   a. using a standard user ID, such as one used for administrative or maintenance purposes to try to guess the password;
   b. generate random or sequential user IDs; or
   c. trying standard common user IDs, such as first names.

The rule-based system may be modified, for instance, to make use of an expected frequency of logins for a given time of day and given day of the week. The rule-based system could be configured to have rules that detect the patterns of entry attempts, as previously described. The system would unobtrusively monitor the data being transmitted for these patterns and when an unauthorized access or attempt to access is detected, the line to the computer data system would be disconnected (employing, for example, the tap as previously described) to prevent further fraud on the system. Thus, any computer data system subject to compromise through dial-up remote login facilities can be protected against fraudulent activity by the method and system of the invention.

It will be apparent that other and further forms of the invention may be devised without departing from the spirit and scope of the appended claims, it being understood that the invention is not limited to the specific embodiments shown.

We claim:

1. A system for preventing fraudulent use of a computer data system dial-up remote login facility comprising:

means for passively monitoring calling activity conducted through the dial up remote login facility of the computer data system after call set-up has been completed between any remote end user of the computer data system and the computer data system;

means for distinguishing between authorized and unauthorized calling activity of any remote end user of the computer data system conducted in the computer data system by comparing the monitored calling activity data with a set of conditions governing authorized and unauthorized uses of the computer data system; and means for disconnecting a call from the computer data system upon the detection of said unauthorized calling activity.

2. The system for preventing fraudulent use of a computer data system dial-up remote login facility according to claim 1, wherein said computer data system comprises a Private Branch Exchange (PBX) telephone system.

3. The system for preventing the fraudulent use of a computer data system dial-up remote login facility as claimed in claim 1, wherein said means for passively monitoring comprises means for routing calling activity data to said monitoring means without interfering with the calling activity through the dial up remote login facility of said computer data system.

4. The system for preventing the fraudulent use of a computer data system dial-up remote login facility as claimed in claim 1, wherein said means for distinguishing between authorized and unauthorized calling activity in the computer data system comprises means for implementing a rule-based expert system for analyzing the monitored calling activity data to detect said unauthorized calling activity.

5. The system for preventing the fraudulent use of a computer data system dial-up remote login facility as claimed in claim 4, wherein said rule-based expert system compares the set of authorized and unauthorized calling activity conditions against the calling activity data being monitored.

6. A system for preventing the fraudulent use of a computer data system dial-up remote login facility, comprising:

a device for passively monitoring calling activity conducted through the dial-up remote login facility of the computer data system after call set-up has been completed between any remote end user of the computer data system and the computer data system;

a modem means for routing calling activity data to said device for passively monitoring without interfering with information transmission to and from said computer data system;

said device capable of distinguishing between authorized and unauthorized calling activity of any remote end user of the computer data system by comparing the monitored calling activity data with a set of conditions governing authorized and unauthorized uses of the computer data system; and means for disconnecting an unauthorized call from the computer data system.

7. The system for preventing the fraudulent use of a computer data system dial-up remote login facility according to claim 6, wherein said computer data system comprises a Private Branch Exchange (PBX) telephone system.

8. The system for preventing the fraudulent use of a computer data system dial-up remote login facility according to claim 6, wherein said device for passively monitoring comprises:

a computer system incorporating rule-based expert system software to compare said monitored calling activity data routed to said monitoring device with the set of conditions governing authorized and unauthorized uses of the computer data system to detect said unauthorized calling activity indicative of fraud.

9. The system for preventing the fraudulent use of a computer data system dial-up remote login facility according to claim 8, wherein said rule-based expert system software comprises:

a set of user-defined rules representative of a plurality of user-defined calling activity conditions indicative of authorized and unauthorized uses of the computer data system to govern action taken by said system for preventing fraudulent use;

a working memory portion for storing said routed calling activity data and intermediate determinations of said system; and an inference engine portion for comparing said routed calling activity data against said set of user-defined rules to detect an unauthorized calling activity condition, triggering disconnection of the call by said means for disconnecting.

10. A method for preventing the unauthorized use of a computer data system dial-up remote login facility comprising the steps of:
   a. passively monitoring calling activity data occurring through the dial-up remote login facility after call set-up has been completed between any remote end user of tile computer data system and the computer data system;
   b. analyzing said monitored calling activity data for conditions indicative of an unauthorized use by any remote end user of the computer data system by comparing said monitored calling activity data against a set of conditions governing both authorized and unauthorized uses of the computer data system; and
   c. disconnecting a call from the computer data system when said monitored calling activity data matches the set of unauthorized use conditions.

11. A method of preventing the unauthorized use of a computer data system dial-up remote login facility comprising the steps of:
   a. routing calling activity data occurring after call set-up has been completed between any remote end user of the computer data system and the computer data system through a port of the dial-up remote login facility without interfering with calling activity of the computer data system to a device for analyzing the monitored data;
   b. analyzing said routed calling activity data with a rule based expert system to identify calling conditions indicative of fraud by comparing said routed calling activity data against a set of conditions governing both authorized and unauthorized uses of the computer data system; and
   c. disconnecting the call from the computer data system when said routed calling activity data matches the set of unauthorized use conditions.

12. A system for preventing fraudulent use of a Private Branch Exchange (PBX) remote maintenance or administration port, comprising:
   means for passively monitoring calling activity of any remote end user of the PBX conducted through the remote maintenance or administration port of the PBX after call set-up has been completed between said end user and the PBX;
   means for distinguishing between authorized and unauthorized calling activity between any remote end user and the PBX remote maintenance or administration port by comparing the monitored calling activity data with a set of conditions governing authorized and unauthorized uses of the PBX; and
   means for disconnecting a call from the PBX remote maintenance or administration port upon the detection of said unauthorized calling activity.

13. The system for preventing the fraudulent use of a PBX remote maintenance or administration port as claimed in claim 12, wherein said means for passively monitoring comprises means for routing calling activity data to said monitoring means without interfering with tile calling activity through the remote maintenance or administration port of said PBX.

14. The system as claimed in claim 13, wherein said means for routing calling activity data comprises a modem configured to operate according to a conventional information transmission standard, without participation in an automatic answering sequence.

15. The system for preventing the fraudulent use of a PBX as claimed in claim 12, wherein said means for distinguishing between authorized and unauthorized calling activity in the PBX remote maintenance or administration port comprises means for implementing a rule-based expert system for analyzing the monitored calling activity data to detect said unauthorized calling activity.

16. The system for preventing the fraudulent use of a computer data system dial-up remote login facility as claimed in claim 15, wherein said rule-based expert system compares the set of authorized and unauthorized calling activity conditions against the calling activity data being monitored by the system.

17. A system for preventing the fraudulent use of a Private Branch Exchange (PBX) remote maintenance or administration port, comprising:
   a device for passively monitoring calling activity of any remote end user of the PBX conducted through the remote maintenance or administration port of the PBX after call set-up has been completed between said end user and the PBX;
   a modem means for routing calling activity data to said device for passively monitoring without interfering with information transmission to and from said PBX;
   said device capable of distinguishing between authorized and unauthorized calling activity of any remote end user of the PBX remote maintenance or administration port by comparing the monitored calling activity data with a set of conditions governing authorized and unauthorized uses of the PBX remote maintenance or administration port; and
   means for disconnecting an unauthorized call from the PBX remote maintenance or administration port.

18. The system as claimed in claim 17, wherein said device for passively monitoring is incorporated as a dedicated unit in operative communication with a given PBX.

19. The system as claimed in claim 17, wherein said device for passively monitoring is incorporated as an adjunct unit in operative communication with a switching system of a telephone network to monitor calling activity conducted through a plurality of PBXs.

20. The system as claimed in claim 19, wherein said adjunct unit includes means for matching a particular calling activity data routed from said telephone network with the corresponding PBX serviced by said adjunct unit.

21. The system for preventing the fraudulent use of a PBX according to claim 17, wherein said device for passively monitoring comprises:
   a computer system incorporating rule-based expert system software to compare said monitored calling activity data routed to said monitoring device with the set of conditions governing authorized and unauthorized uses of the computer data system to detect of said unauthorized calling activity indicative of fraud.

22. The system for preventing the fraudulent use of a PBX remote maintenance or administration port according to claim 21, wherein said rule-based expert system software comprises:
   a set of user-defined rules representative of a plurality of user-defined calling activity conditions indicative of authorized and unauthorized uses of the PBX remote maintenance or administration port to govern action taken by said system for preventing fraudulent use;

a working memory portion for storing said routed calling activity data and intermediate determinations of said system; and an inference engine portion for comparing said routed calling activity data against said set of user-defined rules to detect an unauthorized calling activity condition, triggering disconnection of the call by said means for disconnecting.

23. The system for preventing the fraudulent use of a PBX remote maintenance or administration port as claimed in claim 17, wherein said modem means is configured to operate according to an information transmission standard, without participation in an automatic answering sequence.

24. A system for preventing the fraudulent use of a Private Branch Exchange (PBX) remote maintenance or administration port, comprising:

a device for passively monitoring calling activity conducted through the maintenance or administration port after call set-up has been completed between any remote end user of the PBX and said PBX;

a modem means for routing calling activity data to said monitoring device without interfering with information transmission to and from said PBX;

said device for passively monitoring including a user-defined database of conditions indicative of authorized and unauthorized calling activity data between the end user and the PBX remote maintenance or administration port;

means for comparing said routed calling activity data against said database of authorized and unauthorized conditions; and means responsive to said comparing means for disconnecting an unauthorized call.

25. The system as claimed in claim 24, wherein said device for passively monitoring is incorporated as a dedicated unit in operative communication with a given PBX.

26. The system as claimed in claim 24, wherein said device for passively monitoring is incorporated as an adjunct unit in operative communication with a switching system of a telephone network to monitor calling activity conducted through a plurality of PBXs.

27. The system as claimed in claim 26, wherein said adjunct unit includes:

at least one user defined database for each PBX serviced by said adjunct unit; and means for matching a particular calling activity data routed from said telephone network to the corresponding PBX database.

28. A method for preventing the unauthorized use of a Private Branch Exchange (PBX) remote maintenance or administration port comprising the steps of:

a. passively monitoring calling activity data occurring through the maintenance or administration port after call set-up has been completed between any remote end user and said PBX remote maintenance or administration port;

b. analyzing said monitored calling activity data for conditions indicative of an unauthorized use by any remote end user of the PBX remote maintenance or administration port by comparing said monitored calling activity data against a set of conditions governing both authorized and unauthorized uses of the PBX remote maintenance or administration port; and c. disconnecting a call from the PBX remote maintenance or administration port when said monitored calling activity data matches the set of unauthorized use conditions.

29. A method of preventing the unauthorized use of a Private Branch Exchange (PBX) remote maintenance or administration port comprising the steps of:

a. routing calling activity data occurring after call set-up has been completed between any remote end user and said PBX remote maintenance or administration port through the maintenance or administration port without interfering with calling activity of the PBX to a device for analyzing the monitored data;

b. providing a user-defined set of rules governing conditions indicative of authorized and unauthorized uses of the PBX remote maintenance or administration port;

c. comparing said monitored calling activity data against said set of rules of PBX use;

d. determining whether said monitored calling activity data is an authorized condition under said rules of PBX use; and e. disconnecting the call from the PBX remote maintenance or administration port if said monitored calling activity data is determined to be an unauthorized condition under said rules of PBX usage.

30. The method of preventing unauthorized use of a PBX remote maintenance or administration port according to claim 29, wherein said calling activity data has certain identifying characteristics, and wherein said step of determining whether said monitored calling activity data is an authorized condition includes the steps of:

a. determining the identifying characteristics of the monitored calling activity data;

b. matching the identifying characteristics of the monitored calling activity data to said set of rules governing conditions of authorized and unauthorized use of the PBX remote maintenance or administration port; and c. rejecting the call if the identifying characteristics of the monitored calling activity data matches an unauthorized use condition.

31. The method of preventing unauthorized use of a PBX remote maintenance or administration port according to claim 30, wherein said identifying characteristics of the calling activity data comprise the time and day of the week of the call.

32. The method of preventing unauthorized use of a PBX remote maintenance or administration port according to claim 30, wherein said identifying characteristics of the calling activity data identify the calling activity data as a maintenance or diagnostic command.

33. The method of preventing unauthorized use of a PBX remote maintenance or administration port according to claim 30, wherein said identifying characteristics of the calling activity data identify the calling activity data as an administrative command.

* * * * *